May 7, 1929.    C. S. COATSWORTH    1,711,990
BEET HARVESTING MACHINE
Original Filed Dec. 26, 1924    5 Sheets-Sheet 1

INVENTOR
Caleb S Coatsworth
BY Myron J Dikeman
ATTORNEY

May 7, 1929.  C. S. COATSWORTH  1,711,990
BEET HARVESTING MACHINE
Original Filed Dec. 26, 1924    5 Sheets-Sheet 4
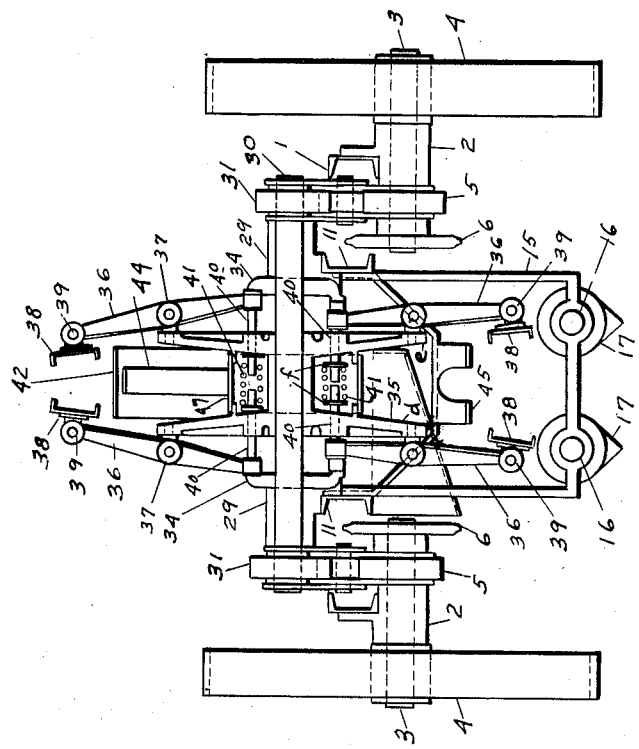
INVENTOR
Caleb S Coatsworth
BY Myron J Dikeman
ATTORNEY May 7, 1929.　　C. S. COATSWORTH　　1,711,990
BEET HARVESTING MACHINE
Original Filed Dec. 26, 1924　　5 Sheets-Sheet 5
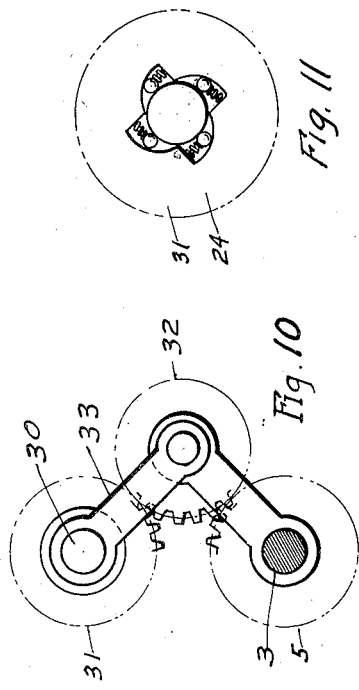
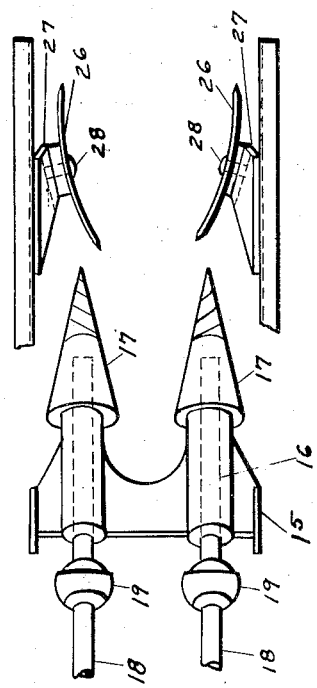
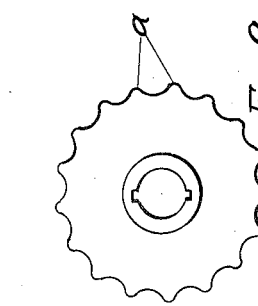
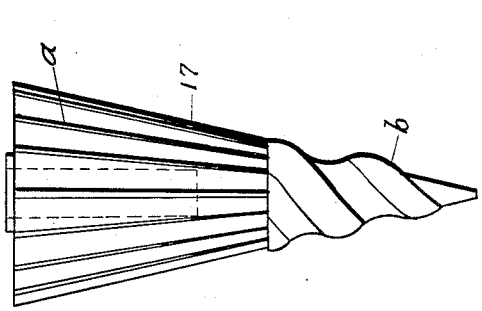
INVENTOR
Caleb S Coatsworth
BY
Myron J Dikeman
ATTORNEY Patented May 7, 1929.

1,711,990

UNITED STATES PATENT OFFICE.

CALEB S. COATSWORTH, OF CHATHAM, ONTARIO, CANADA, ASSIGNOR OF ONE-FOURTH TO ALBERT SELAK, OF WINDSOR, CANADA, AND THREE-FOURTHS TO MYRON J. DIKEMAN, OF DETROIT, MICHIGAN.

BEET-HARVESTING MACHINE.

Application filed December 26, 1924, Serial No. 758,129. Renewed August 20, 1928.

My invention relates to a beet harvesting machine, the purpose of which is to pull and remove the beet roots from the soil in which they are grown. It is commonly known that the beet, also known as a sugar beet, is of root formation, growing wholly within the soil, and producing a leafy foliage above the ground, and is planted and cultivated in rows across the field. When the root is ready for harvesting it must be pulled from the soil and the leafy top cut from the root before it is ready for marketing and shipping.

The object of my invention is to provide a machine which will operate within the soil, for loosening and lifting the root clear therefrom, and at the same time remove all the dirt therefrom.

Another object of my invention is to provide a machine for harvesting beet roots, that after lifting the root clear from the soil, will cut the leafy top therefrom, and separate the roots from the beet tops, and leave them ready for marketing.

A further object is to provide a beet harvester that can be operated together, separate and deposit the beet roots in piles along the row, as the machine is propelled over the ground.

These several objects are attained in the preferred form by the construction and arrangement of parts more fully hereinafter set forth.

Similar parts on all drawings are marked by similar numerals.

Fig. 4 is a sectional view —BB— of Fig. 1, showing the relative position of the operating mechanism to the rotary beet plows.

Fig. 5 is an enlarged detail of the clamping device and means for operating same for engaging and releasing the beet root.

Fig. 6 is a detail of the operation cam clamp for forcing the operation arms apart to release the beet root after the tops have been cut therefrom.

Fig. 7 is a sectional view —CC— of Fig. 2, showing the rotary plows and cutting discs and means for supporting same in the machine.

Fig. 8 is a detail of the right hand rotary plow cone showing the fluted and spiral surface thereon.

Fig. 9 is a top view of the rotary plow cone.

Fig. 10 is a sectional view —DD— of Fig. 1, showing the adjustable driving mechanism for rotating the interior beet lifting wheel.

Fig. 11 is a detail of the ratchet for attaching the drive gears —24— and —31— to their respective shafts.

Figure 1:
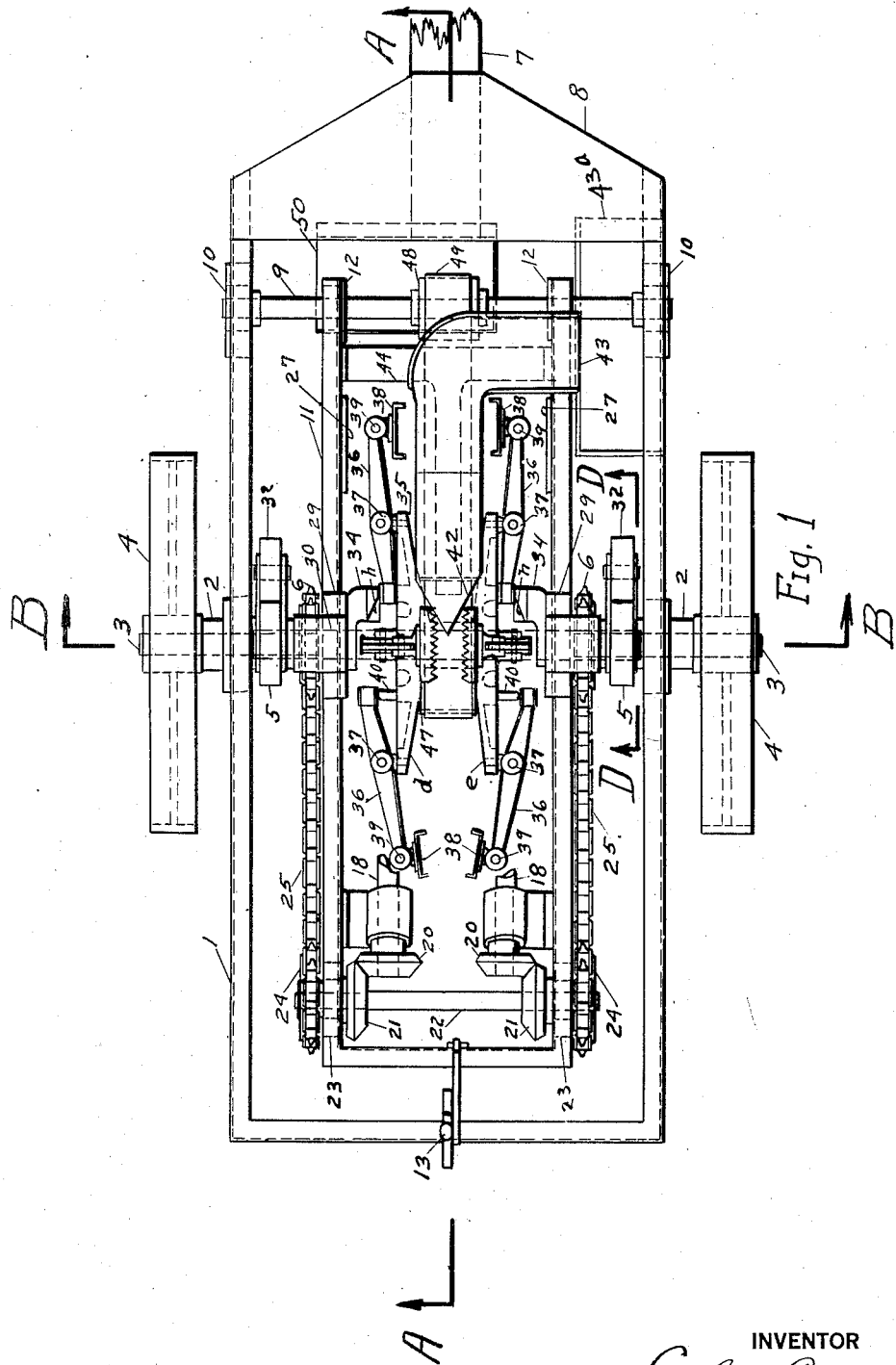
Fig. 1 shows a plan view of the assembled harvester showing the general position of the operating parts, and their relative position to each other.
Figure 2:
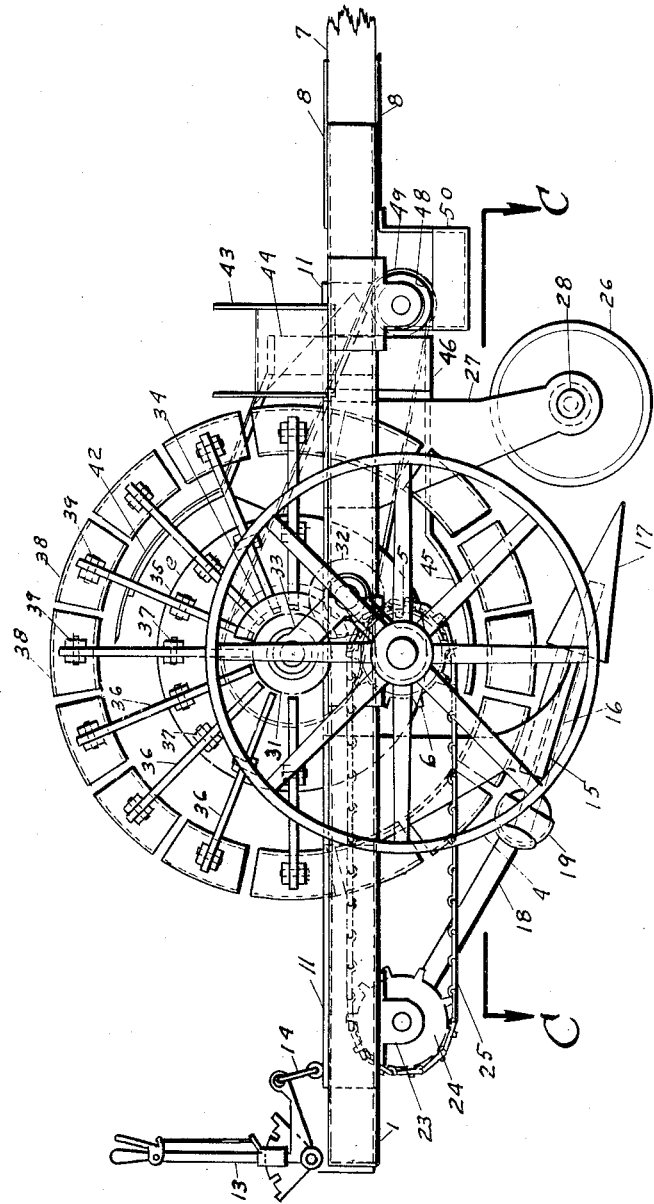
Fig. 2 is a side view of the harvester.
Figure 3:
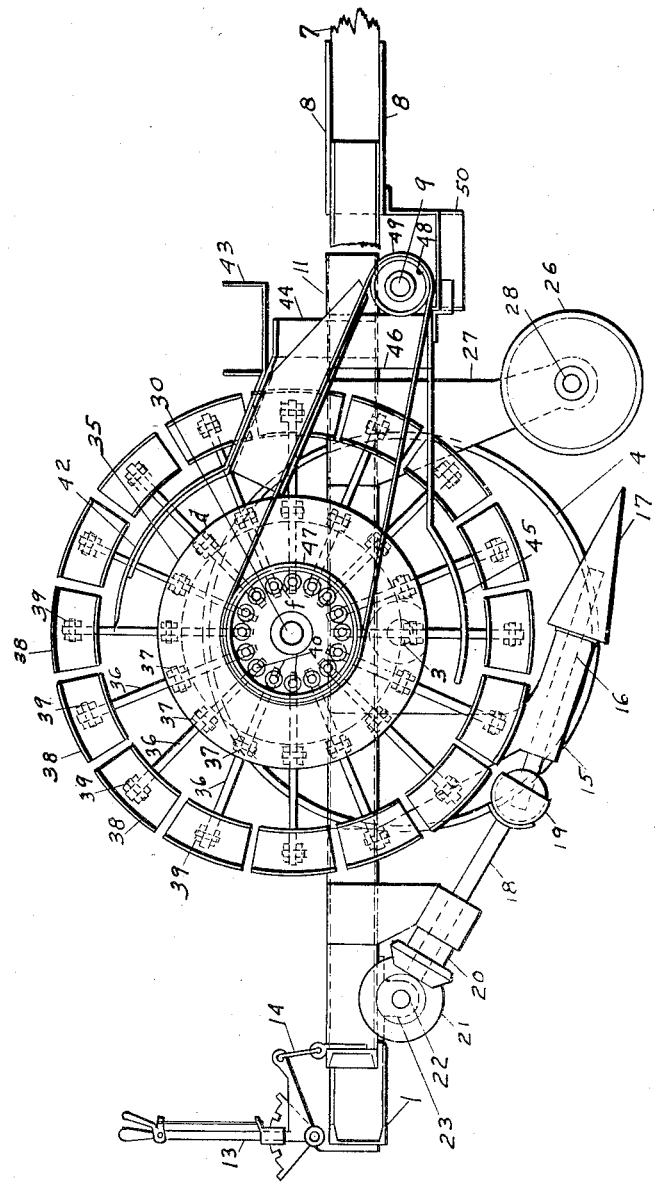
Fig. 3 is a sectional view —AA— of Fig. 1, showing the interior operating mechanism, and means for propelling the rotating parts therein.

I will now describe more fully the detailed construction of my harvester, referring to the drawings and the marks thereon.

The general construction of my harvester comprises a wheeled vehicle suitable for being propelled, or drawn over the ground, and over the row of beets as are grown in the field, and provided with a rigid supporting frame mounted on the vehicle wheels, carrying therein a center adjustable operating frame for supporting and operating the harvester mechanism. Attached to the lower section of the adjustable frame is a double rotary lifting plow, so positioned and adjusted as to engage the soil with one rotary plow cone on each side of the beet row, loosening and breaking the dirt from the beet and lifting the root from the soil directly into the lifting mechanism of the harvester. Directly ahead of the rotary plow cones are positioned two curved disc cutting wheels, placed angularly with center line of the machine and inclined toward the row of beets, for cutting and opening the soil ahead of the rotary plows. Suitable mechanism is attached to the rotary plows for operating them as the harvester is drawn over the ground. Directly above the rotary plows, and mounted centrally on the adjustable frame, is a double circular beet wheel, provided with circumferential beet lifting clamps, supported and operated by suitable mechanism, in such a manner as to clamp on and engage the beet roots as they are lifted from the soil by the rotary plows, carrying the beets to the top of the wheel where it is forced against a topping knife, severing the tops from the beet root, and then automatically releasing the root to fall into a chute leading to the root box at the side of the harvester. The roots are then deposited on the ground in piles, by means of a trap in the bottom of the root box. The tops as are severed from the beet root, fall on an interior operated belt within the wheel, and are carried forward to fall into a side chute and deposited along the ground as they come from the machine.

The frame —1— is made of a rigid steel channel, or of a steel bar if preferred, and securely attached to the wheel bearing castings —2— on each side of the frame. Mounted within the bearings —2— is a rotating axle —3—, passing therethrough and free to rotate therein. At the outer end of the axle —3—, on both sides of the frame —1—, are the drive wheels —4—, for supporting and driving the operating mechanism of the harvester. On the inside ends of axle —3— is fixedly attached a drive gear —5—, for driving and operating the double beet wheel as mounted on the interior adjustable frame. Also mounted on the inner ends of the axle —3—, inside of the gear —5—, and adjacent thereto, is the drive sprocket —6— fixedly attached to the axle. The frame —1— being a rigid rectangular form, provided with a draw bar —7— at the forward end thereof and rigidly connected thereto by means of the steel plates —8—. Across the front of the frame —1— is mounted a draw shaft —9— fixedly attached to the frame —1— by the side castings —10—, and held firmly therein. Pivotally mounted on the bearing shaft —9— is the interior adjustable frame —11—, also constructed of a rigid steel channel frame, rectangular in form and attached to the draw shaft —9— by means of the bearings —12—, and which bearings are free to move or turn thereon as the rear end of the adjustable frame is raised and lowered. The rear end of the frame —11— is attached to the operating lever —13—, and which lever is rigidly supported by the main supporting frame —1—, being connected by means of the link —14— for raising and lowering the rear end of the adjustable frame —11— and its supported mechanism. Attached to the under side of the operating frame —11—, and near the center thereof, is a rigid double plow frame —15—, for supporting and forcing the double rotary plow cones —17— into the soil. Rotatably mounted within the double plow frame casting are two plow shafts —16—, passing through the casting, in a direction parallel with the axis of the frame, and at an angle pointing downward and toward the front of the machine frame, so positioned that one shaft will pass on each side of the passing beet row as the harvester is propelled along. At the forward end of each of the shafts —16—, concentric with the axis thereof, is fixedly attached a rotary plow cone —17—, shown in detail in Fig. 8, said cone being formed by a series of fluted ridges —a— along the elements of the cone surface for about two thirds of the length thereof from its base, and having the remainder of the apex forming a spiral —b— thereon, for drawing the point in the soil and breaking and loosening same from the beet root. The plow cones being made with right hand and left hand spiral points thereon, as each rotary plow point revolves in opposite directions, turns the bottom of the cone toward the center line of the frame, or beet row, and upward, for engaging the beet root and lifting same from the soil. The rear end of the plow shafts —16— is attached to the drive shaft —18—, and is connected thereto by means of the universal joint —19—. The shaft —18— is rotated by the bevel gears —20—, fixedly attached thereto, and which gear meshes with the drive gears —21—. The drive gears —21— are fixedly mounted on the drive shaft —22—, same being mounted thereon so as to face each other, and engage the bevel gears —20— from the outside thereof, thus causing the plow shafts —18— to rotate in opposite directions. The drive shaft —22— is rotatably mounted on the rear of the adjustable frame —11— by the bearings —23— fixedly attached thereto. On both outer ends of the drive shaft —22— is mounted a drive sprocket gear —24—, engaging therewith by means of a ratchet, or clutch, as illustrated in Fig. 11, for allowing an adjustment when turning the harvester around. The drive sprockets —24— are driven by the sprocket chains —25— which also engages the main drive sprockets —6— attached to the inner ends of the wheel axles —3—, which operate and propel the rotary plows as the harvester is propelled over the ground. Directly in front of each of the rotary plow cones, is positioned a curved cutting disc —26—, so positioned that the forward edge cuts straight into the soil, to the desired depth, and the rear edge of the discs angling toward the interposed beet row, or centerline of the machine, for the purpose of breaking and loosening the soil ahead of the rotary plow cones —17—. The cutting discs —26— are supported by rigid frames —27—, fixedly attached to the adjustable frame —11—, the discs —26— being pivoted thereto by the pivot axle —28—. On the top of the adjustable frame —11— and fixedly attached thereto, directly above the drive wheel axles —3—, are the shaft bearings —29—. Through the bearings —29— passes the beet lifting wheel shaft —30— and which is free to rotate therein. On both the outer ends of the shaft —30—, and attached thereto by means of ratchet, or clutch connections as illustrated in Fig. 11, is a drive gear —31—, said gear —31— being connected with the drive gear —5— on shaft —3—, by means of an idler gear —32— interposed therein by means of an adjusting gear frame —33—, as shown in section in the enlarged detail in Fig. 10, or by any suitable adjustable gear mechanism, thus rotating the interior beet wheel directly with the drive wheels —4—. Attached to the inner face of both the bearings —29— is a semicircular cam clamp —34— which extends only a part of the circumference around shaft —30—, and being positioned on the forward side of the shaft facing the front of the machine. In the center of the shaft —30— and fixedly attached thereto is a double arm operating casting —35—, comprising two circular flanges —d— and —e—, connected by a central hub therein for attaching same to the shaft —30—, said casting —35— being positioned over the center line of the adjustable frame, and of the harvester, directly over the centerline of the rotary plows —17—. Pivoted to the outer circumferences of the flanges —d— and —e—, arranged in pairs and radially interposed thereon, are numerous clamp operating arms —36—, attached thereto by means of the pivot joint —37— and free to rock thereon. On the outer ends of each of the operating arms —36— is pivoted a root clamp —38—, also attached thereto by the pivot joint —39—, being free to rock thereon to conform to the shape of the beet root when the clamps are forced together thereon. The inner ends of the operating arms —36— extend to near the center of the casting —35—, and engage the projecting ends of operating pins —40—, and cam clamp —34— during the rotation of the wheel. An operating pin —40— is positioned to engage the inner end of each of the operating arms, extending through the wall —d— and —e— of casting —35—, and are provided with a collar flange —f— on the inner end thereof, being arranged in pairs opposite the pairs of arms aforesaid, and receive a single coil spring —41— interposed between the flanged collars —f—, and which spring always exerts an outward pressure on both the operating pins —40—, tending to close the pairs of operating arms —36— and clamps —38— upon the beet root, when the arm is released from behind the cam clamp —34— mounted on the face of bearing —29—. The cam clamp —34—, shown in Fig. 6, is semicircular in form, placed concentric with the shaft —30—, positioned on the forward side of the said shaft, and extending less than half way around. The upper edge of the cam —34— is beveled at the section —h—, for engaging the inner end of the operating arms —36— when forced out by the operating pins —40—, thus forcing the arms together against the pressure of the coil springs —41— and spreading the beet clamps —38— and releasing the beet root therefrom. The clamp cam —34—, being on the forward side of the shaft —30— allows the operating arms —36— to pass off the lower end thereof when reaching the extreme downward position of the rotating beet wheel, and the action of the coil springs —41— on the operating pins —40— against the arms, forces the beet clamps —38— to engage the beet root as it is lifted from the ground by the rotary plows —17—, carrying the root to the top of the wheel where it is forced against the edge of the topping knife —42—, cutting the tops from the beet root. At this point, the inner ends of the operating arms —36— re-engage the cam clamp —34—, forcing the arms inward and releases the beet root from the clamps —38—, where they fall into the beet chute —43— and into the beet box —43ª— and are deposited on the ground in piles as the harvester is operated over the row of beets. The operating arms —36— while engaging the cam clamp —34— on the downward motion remains wide open until again reaching the lower position of the rotating beet wheel, are there released from the cam and again close and engage the beet roots being lifted from the plows —17—. The successive arms and beet clamps operating in this manner, provide a continuous means for lifting and topping the beets as they are lifted from the soil by the plows. The topping knife —42— carries a sharp forward point thereon for engaging the beet root and cutting the tops therefrom, and is curved and positioned inside the rotating beet wheel clamps concentric with the shaft —30— and is supported by the frame —44— which is fixedly attached to the sides of the adjustable frame —11—. Within the lower half of the beet wheel, and concentric with the curved topping knife —42—, is a double beet gage bar —54—, positioned along the centerline of the adjustable frame and also directly over the centerline of the rotary beet plows, and for gaging the height of the beet roots which are being lifted into the wheel by the plows to place them in correct position for the topping knife —42—, when rotated to the top of the beet wheel. The gage bars —45— are held in position by the rigid bars —46— attached to the sides of the adjustable frame —11—. Around the central portion of the operating casting —35—, and inclosing the operating pins —40— and coil springs —41—, is mounted the belt pulley —47— fixedly attached thereto. Directly in front of the pulley —47— and on the draw shaft —9—, is mounted a loose idler pulley —48—, carrying a conveyor belt —49—, and which belt engages both pulleys —47— and —48—, forming a conveyor for the severed beet tops as they are cut from the roots by the topping knife —42—, and deposits the same in the top chute —50— in the forward portion of the frame and thence on the ground. The root box —43ª— is fixedly attached to the main supporting frame —1—, and is provided with a trap door in the bottom thereof, for releasing and depositing the beet roots on the ground in piles as the harvester is propelled over the beet row.

Having fully described my beet harvester, what I claim as my invention and desire to secure by Letters Patent is:

1. A beet harvesting machine adapted for pulling and topping beet roots, comprising in combination a wheeled vehicle having a rigid supporting frame mounted thereon, an interior adjustable frame hinged to the end of said supporting frame, a double cone beet plow attached to the lower side of said adjustable frame and proceeded by double in-throw cutting discs, a double disc casting wheel rotatably mounted across the adjustable frame and actuated by the drive wheels of the vehicle, a series of pairs of clamp arms radially mounted around the perimeters of the double disc casting wheel, one arm of each pair being attached to each disc and pivoted thereto near the center of the arms, adjustable beet clamps pivotally attached to the outer ends of all the clamp arms, a series of interior operating pins slidably mounted in each of the disc walls of the double disc casting, said pins engaging the inner ends of the clamp arms, a compression coil spring mounted on each of the said operating pins for forcing the pin and arms outward for closing the attached beet clamps together, semi-circular operating cams fixedly attached to the sides of the adjustable frame, said cams being positioned to engage the inner ends of the clamp arms during the downward portion of its rotation for holding said clamp arms open, an interior topping knife fixedly interposed between the outer ends of the pairs of clamp arms near the top of the wheel and means for conveying the severed beet tops from the wheel.

2. A beet harvesting machine adapted for lifting and topping beet roots, comprising a wheeled vehicle having a fixedly attached supporting frame mounted thereon, an interior adjustable frame hinged to the end of the supporting frame, a double rotatable cone beet lifting plow mounted on the lower side of the adjustable frame, means actuated by the vehicle wheels for operating said plows in opposite directions, two curved cutting discs rotatably mounted directly ahead of the rotatable lifting plows, said cutting discs being arranged in a V-shaped position with the rear edges of the discs converging together, a double disc casting wheel mounted across said adjustable frame, geared means actuated by the vehicle wheels for rotating said double disc casting wheel, series of pairs of radially interposed clamp arms mounted around the perimeters of said casting disc and pivoted thereto near the centers of the arms, one arm of each pair on each disc, operating pins slidably mounted through the walls of the double disc casting wheel and so positioned therein as to engage the inner ends of the clamp arms, arranged in pairs, each pair of operating pins is provided with a compression coil spring mounted between the inner ends thereof, semi-circular operating cams fixedly attached to the sides of the adjustable frame, concentric with the double disc casting wheel and on the forward side of the shaft for engaging the inner ends of the clamp arms during the downward portion of the rotation of the said wheel, beet clamps pivotally attached to the outer ends of the pairs of clamp arms, a fixed interposed beet topping knife projected within the lifting wheel and a conveyor belt mounted around the center of the double disc casting for carrying the beet tops from the wheel.

3. A beet harvesting machine adapted for loosening and lifting a beet root from the soil, and freeing the same from clinging dirt, used in combination with a wheeled vehicle having a supporting frame and a double rotatable lifting wheel mounted thereon, comprising two fluted auger pointed cone plow points rotatably mounted side by side on the under side of the supporting frame, means attached thereto for rotating both of said cone plow points in opposite directions, said cone points being positioned directly beneath the double rotatable lifting wheel and pointing towards the front of the harvester frame, two curved cutting discs, arranged as a pair and rotatably mounted directly ahead of the cone points, on the under side of the supporting frame, said curved discs being so positioned that the forward edges thereof cut straight into the soil ahead of each of the cone points, and the rear edges of the curved discs converge together toward the centerline of the beet row which passes therebetween, for cutting and breaking the soil and breaking the dirt from the roots.

In witness whereof I sign this specification.

CALEB S. COATSWORTH.